United States Patent
Goma

(10) Patent No.: US 8,761,531 B2
(45) Date of Patent: Jun. 24, 2014

(54) IMAGE DATA COMPRESSION INVOLVING SUB-SAMPLING OF LUMA AND CHROMA VALUES

(75) Inventor: Sergiu R. Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 665 days.

(21) Appl. No.: 12/629,677

(22) Filed: Dec. 2, 2009

(65) Prior Publication Data

US 2011/0007979 A1   Jan. 13, 2011

Related U.S. Application Data

(60) Provisional application No. 61/224,427, filed on Jul. 9, 2009.

(51) Int. Cl.
G06K 9/36 (2006.01)
G06K 9/38 (2006.01)
G06K 9/46 (2006.01)

(52) U.S. Cl.
USPC ........................................................ 382/251

(58) Field of Classification Search
None
See application file for complete search history.

(56) References Cited

U.S. PATENT DOCUMENTS

| | | | |
|---|---|---|---|
| 3,971,065 A | 7/1976 | Bayer | |
| 4,896,364 A * | 1/1990 | Lohscheller | 382/162 |
| 5,018,017 A | 5/1991 | Sasaki et al. | |
| 5,220,410 A | 6/1993 | Wakeland et al. | |
| 5,493,335 A * | 2/1996 | Parulski et al. | 348/231.6 |
| 5,614,957 A * | 3/1997 | Boyce et al. | 348/567 |
| 5,978,443 A * | 11/1999 | Patel | 378/62 |
| 6,208,689 B1 | 3/2001 | Ohira et al. | |
| 6,370,271 B2 * | 4/2002 | Fu et al. | 382/217 |
| 6,807,311 B1 * | 10/2004 | Callway et al. | 382/250 |
| 6,965,705 B1 | 11/2005 | Ma et al. | |
| 6,987,544 B2 * | 1/2006 | Ogata et al. | 348/678 |
| 7,081,919 B2 * | 7/2006 | Jaspers | 348/223.1 |
| 2001/0013896 A1 | 8/2001 | Anderson | |
| 2003/0016306 A1 * | 1/2003 | Ogata et al. | 348/671 |
| 2004/0027461 A1 | 2/2004 | Boyd | |
| 2004/0120594 A1 | 6/2004 | Vitali et al. | |
| 2004/0155980 A1 | 8/2004 | Itoh et al. | |
| 2004/0202375 A1 | 10/2004 | Kalevo | |
| 2005/0141614 A1 * | 6/2005 | Braspenning et al. | 375/240.16 |

(Continued)

FOREIGN PATENT DOCUMENTS

EP   0323274 A2   7/1989
EP   1401211 A2   3/2004

(Continued)

OTHER PUBLICATIONS

N.D. Wells, "Digital Video: YUV Bit Rate Reduction for Broadcasting Applications," Tenth International Broadcasting Convention, Sep. 21-25, 1984.

(Continued)

*Primary Examiner* — Samir Ahmed
(74) *Attorney, Agent, or Firm* — Espartaco Diaz Hidalgo

(57) ABSTRACT

Chroma values in image data may be sub-sampled, thereby obtaining sub-sampled chroma values. The sub-sampled chroma values may be compressed, thereby obtaining compressed, sub-sampled chroma values. Luma values in the image data may be compressed, thereby obtaining sub-sampled luma values. Edge information for the luma values that are discarded as part of the luma sub-sampling operation may be determined.

40 Claims, 14 Drawing Sheets

(56) References Cited

U.S. PATENT DOCUMENTS

| | | | |
|---|---|---|---|
| 2005/0169551 A1 | 8/2005 | Messing et al. | |
| 2006/0002611 A1 | 1/2006 | Mantiuk et al. | |
| 2006/0008154 A1* | 1/2006 | Belle | 382/232 |
| 2006/0227222 A1* | 10/2006 | Jaspers | 348/222.1 |
| 2007/0216951 A1 | 9/2007 | Shiraishi | |
| 2009/0003720 A1 | 1/2009 | Sun et al. | |

FOREIGN PATENT DOCUMENTS

| | | |
|---|---|---|
| EP | 1613097 A1 | 1/2006 |
| EP | 1978746 A2 | 10/2008 |
| JP | H1098731 A | 4/1998 |
| JP | 2000152226 A | 5/2000 |
| JP | 2002199393 A | 7/2002 |
| JP | 2006033750 A | 2/2006 |
| JP | 2007251860 A | 9/2007 |
| WO | WO9314600 A1 | 7/1993 |
| WO | 2006/129183 | 12/2006 |
| WO | WO2008011502 | 1/2008 |

OTHER PUBLICATIONS

Yufei Yuan et al., "Embedded Color Image Coding Using Context-Modeled Wavelet Difference Reduction," IEEE International Conference on Acoustics, Speech, and Signal Processing, 2004, vol. 3, pp. 61-64.

International Search Report and Written Opinion—PCT/US2010/041425—International Search Authority, European Patent Office,Dec. 8, 2010.

Taiwan Search Report—TW099122743—TIPO—Sep. 23, 2013.

* cited by examiner

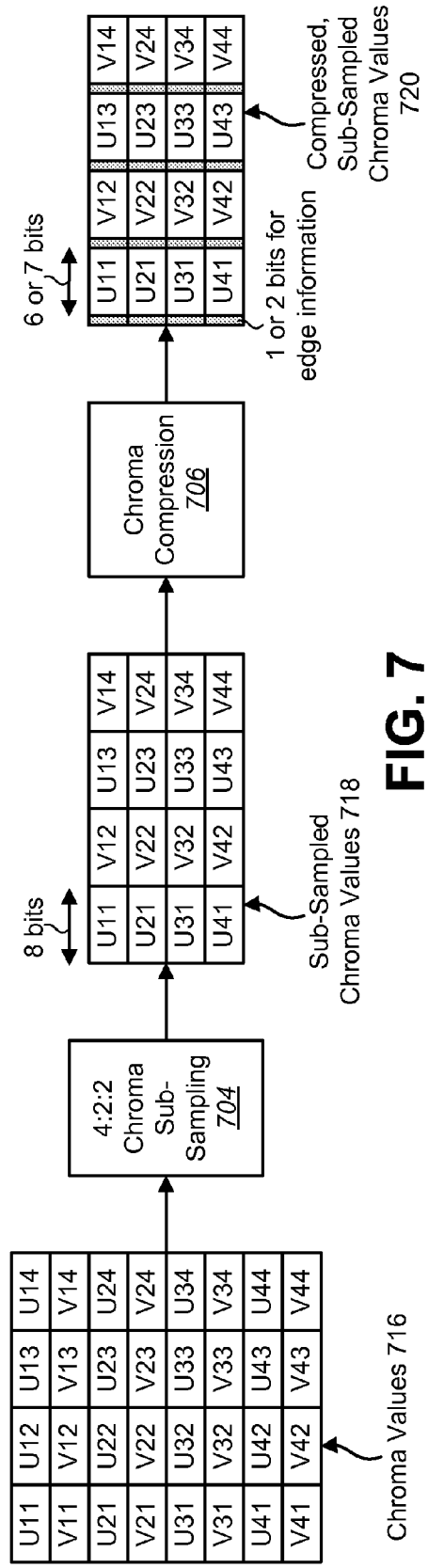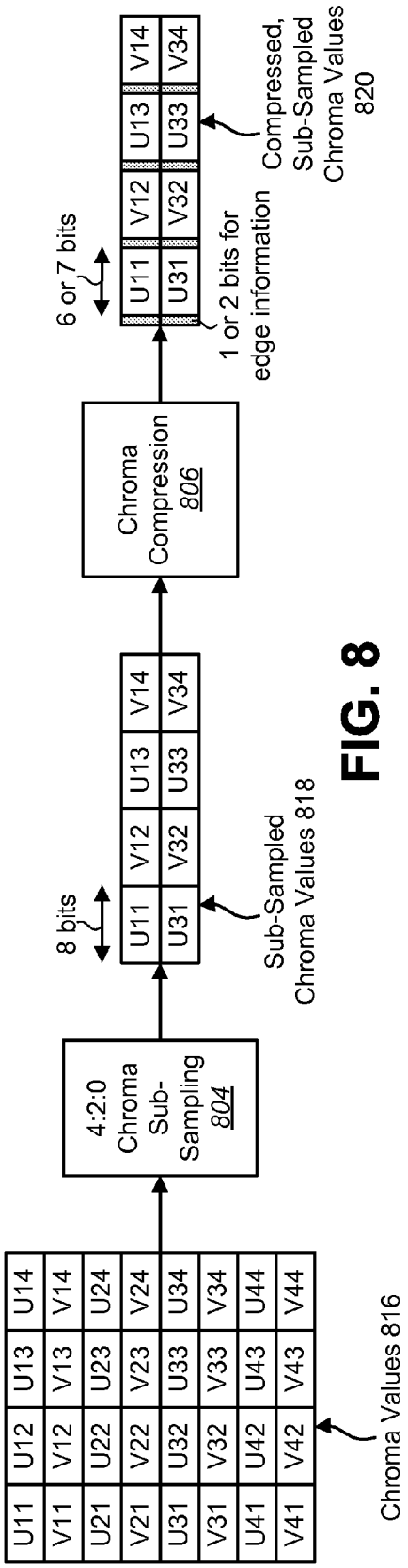

FIG. 10

| Edge bits for Y12 | Edge bits for Y14 | | | |
|---|---|---|---|---|
| Y11 | U12 | Y13 | U14 | Y15 | U16 |
| V21 | Y22 | V23 | Y24 | V25 | Y26 |
| Y31 | U32 | Y33 | U34 | Y35 | U36 |
| V41 | Y42 | V43 | Y44 | V45 | Y46 |

Compressed Image Data 1026

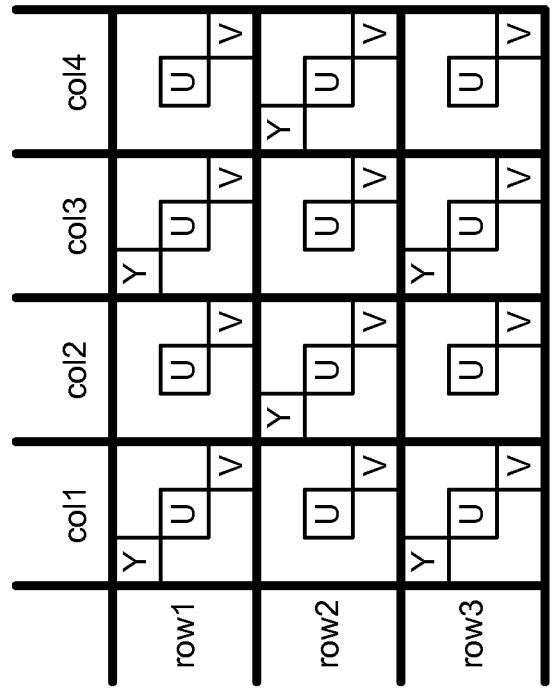
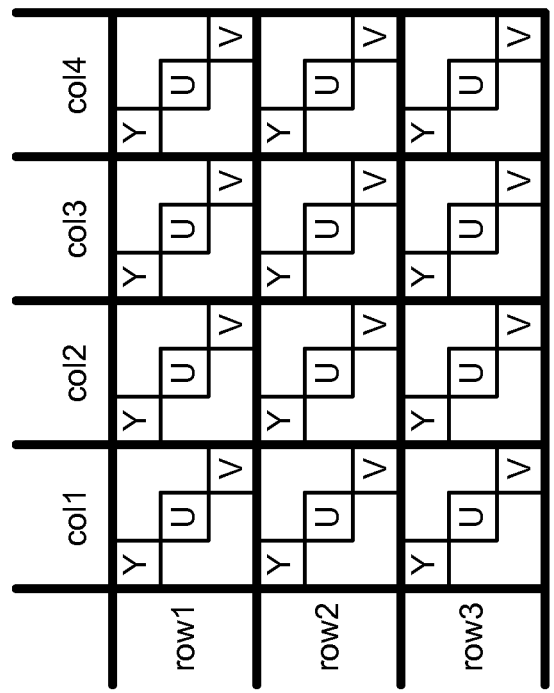
FIG. 12

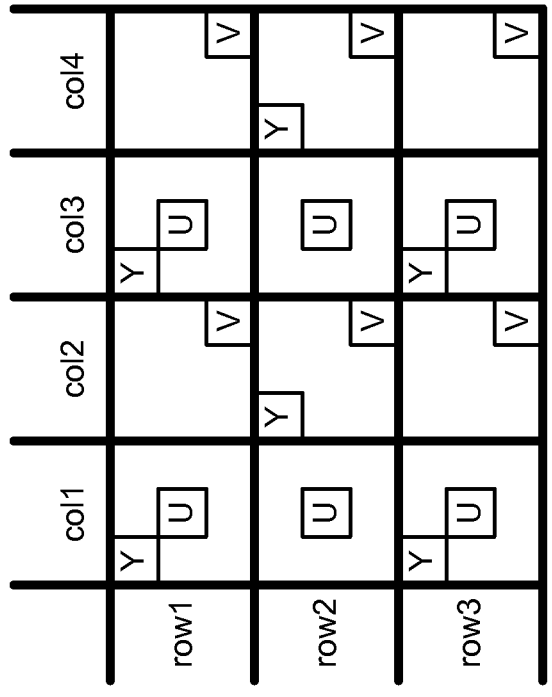
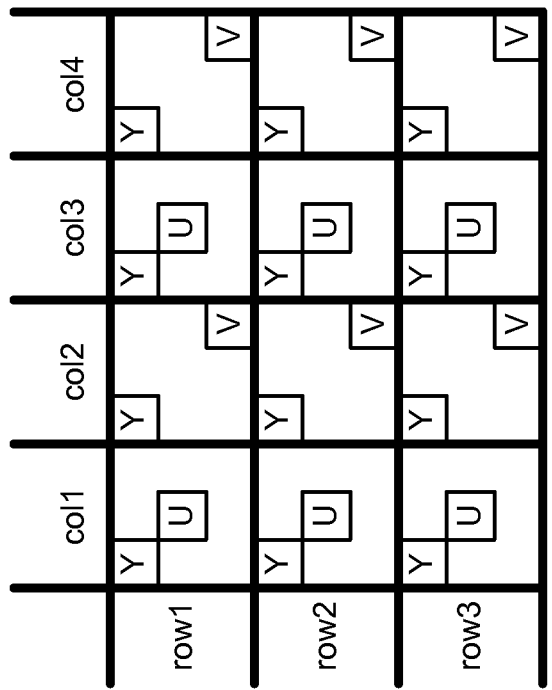
FIG. 13

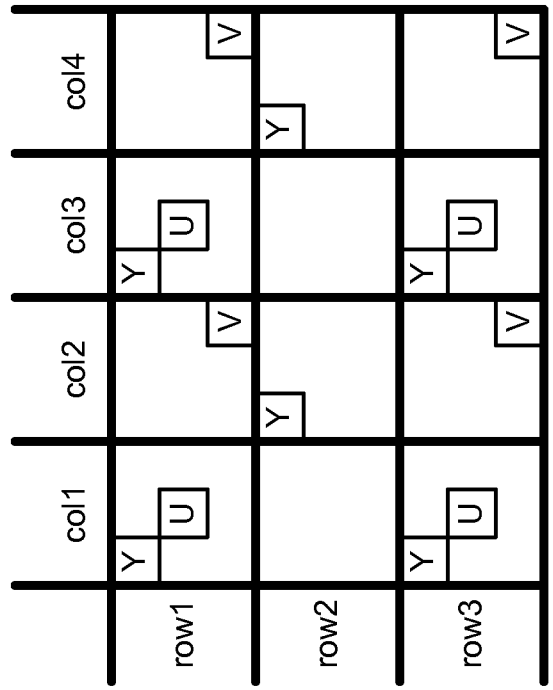
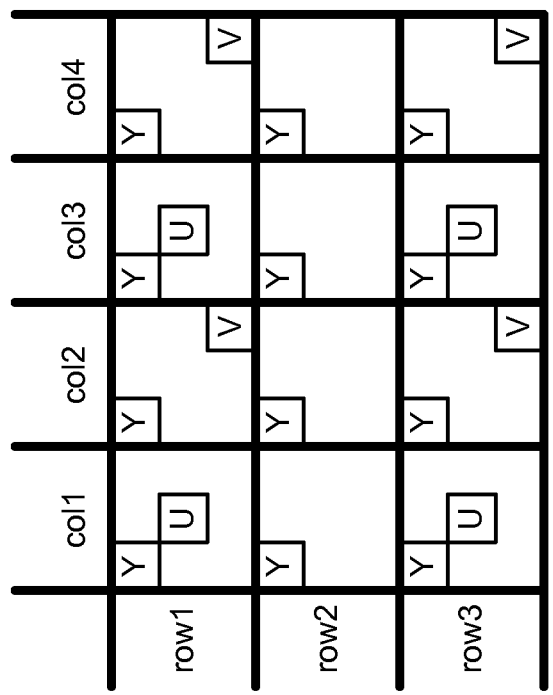
FIG. 14

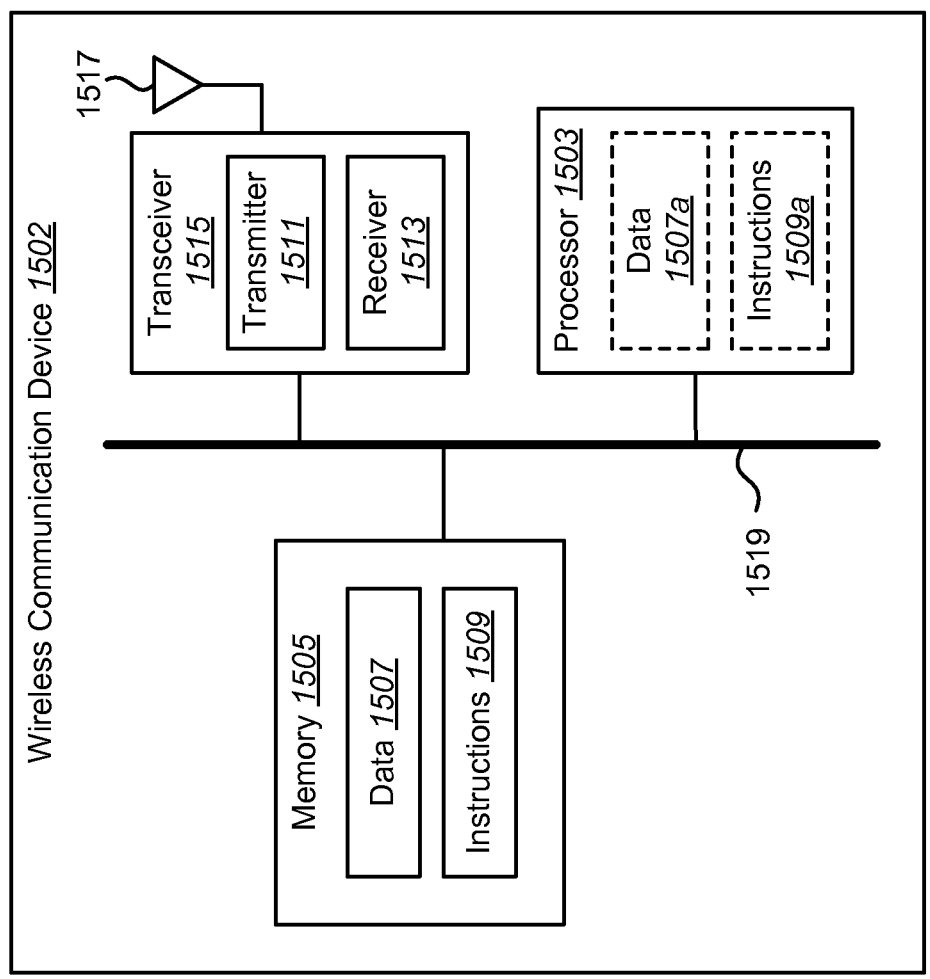

IMAGE DATA COMPRESSION INVOLVING SUB-SAMPLING OF LUMA AND CHROMA VALUES

RELATED APPLICATIONS

This application is related to and claims priority from U.S. Provisional Patent Application Ser. No. 61/224,427, filed Jul. 9, 2009, for "Luminance/Chrominance Subsampling Pattern and Method To Achieve 8 Bit Per Pixel Visually Lossless," with inventor Sergio R. Goma.

TECHNICAL FIELD

The present disclosure relates generally to image data compression. More specifically, the present disclosure relates to systems and methods for image data compression involving sub-sampling of luma and chroma values.

BACKGROUND

A digital image may be put into a luma-chroma color space before being encoded. In that form, the color of a pixel is described by three numerical values: one describing its brightness (luma) and two describing its color (chroma). These three numerical values may be identified as Y, U and V. Y is the luma value, and U and V collectively form the chroma value.

Chroma sub-sampling is the practice of encoding images by implementing less resolution for chroma (UV) information than for luma (Y) information. With chroma sub-sampling, the luma value (Y) for each pixel in a digital image may be included in the digital data stream to be encoded. However, only a single chroma pair (UV) is included in the data stream for a group of pixels.

The notation for a chroma sub-sampling pattern is in the form J:a:b. The notation utilizes the concept of a "reference block," which is a conceptual region that is J pixels wide and 2 pixels high. The indicator value "a" shows the number of chroma values that are included for the top row of the J×2 reference block. The indicator value "b" shows the number of chroma values that are included for the bottom row of the J×2 reference block.

For example, in a reference block that is four pixels wide and two pixels high, YUV 4:4:4 would encode eight chroma values (i.e., four U values and four V values) for the top row of the reference block, and eight chroma values for the bottom row of the reference block. In other words, with YUV 4:4:4, no chroma sub-sampling takes place. For the same 4×2 reference block, YUV 4:2:2 would encode four chroma values (i.e., two U values and two V values) for the top row of the reference block, and four chroma values for the bottom row of the reference block. For the same 4×2 reference block, YUV 4:2:0 would encode two chroma values for the top row of the reference block, and two chroma values included for the bottom row of the reference block.

BRIEF DESCRIPTION OF THE DRAWINGS

FIG. 7 illustrates an example showing how chroma values may be sub-sampled and then compressed;

FIG. 8 illustrates another example showing how chroma values may be sub-sampled and then compressed;

FIG. 10 illustrates the compressed image data that may be formed from the example of FIG. 9;

FIG. 12 illustrates a comparison of YUV 4:4:4 and SYUV 4:4:4;

FIG. 13 illustrates a comparison of YUV 4:2:2 and SYUV 4:2:2;

FIG. 14 illustrates a comparison of YUV 4:2:0 and SYUV 4:2:0; and

FIG. 15 illustrates certain components that may be included within a wireless communication device.

DETAILED DESCRIPTION

Figure 1:
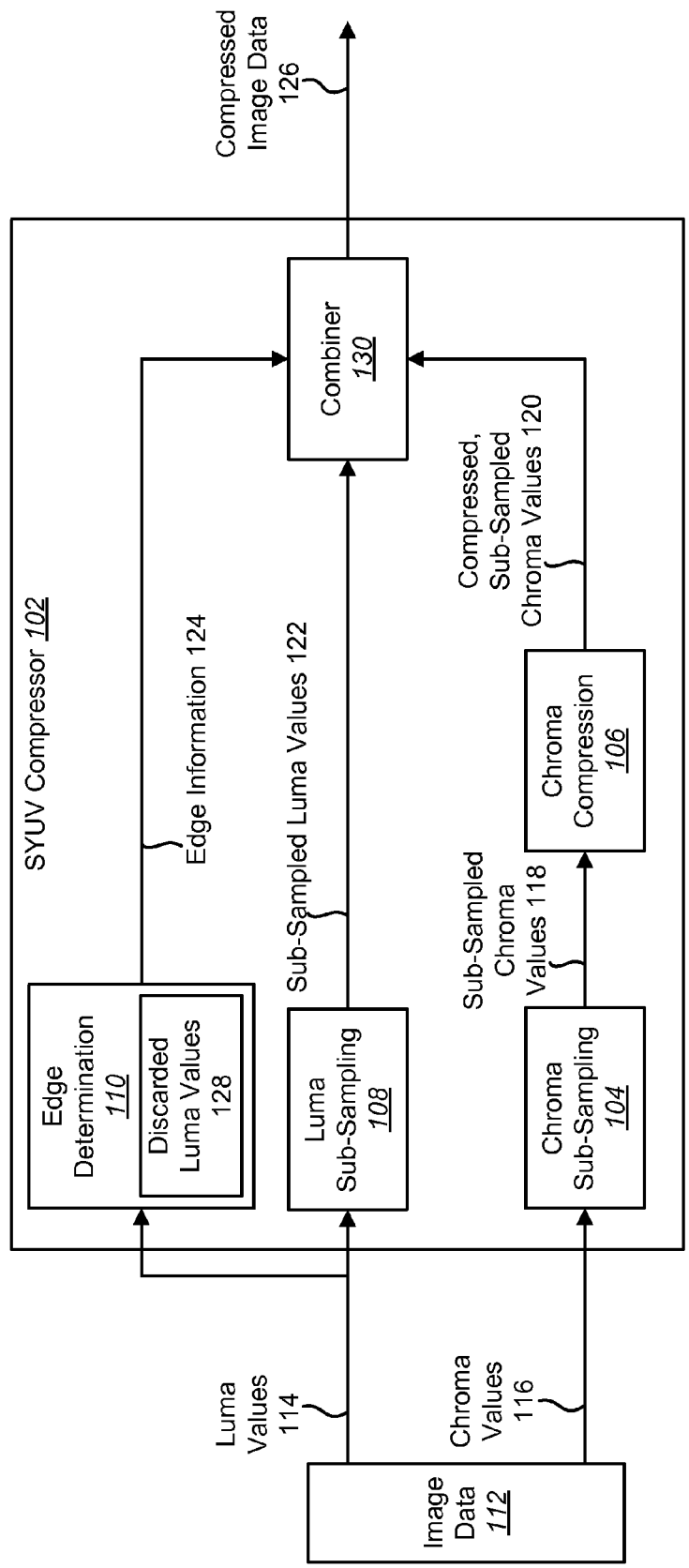
FIG. 1 illustrates an example of an SYUV compressor.

The present disclosure relates generally to an efficient YUV format. In accordance with the present disclosure, an efficient YUV format may be achieved by sub-sampling the luma values and the chroma values, compressing the sub-sampled chroma values, and including edge information for the discarded luma values in the space that was created by compressing the sub-sampled chroma values. Advantageously, compressed image data in accordance with the techniques disclosed herein may be perceptually lossless. For clarity, a YUV format in accordance with the present disclosure will be referred to as SYUV, in order to distinguish the formats that are disclosed herein from known YUV formats.

A method for compressing image data is disclosed. The method includes sub-sampling chroma values in the image data, thereby obtaining sub-sampled chroma values. The method also includes compressing the sub-sampled chroma values, thereby obtaining compressed, sub-sampled chroma values. The method also includes sub-sampling luma values in the image data, thereby obtaining sub-sampled luma values. The method further includes determining edge information for the luma values that are discarded as part of the luma sub-sampling operation.

The luma values may be sub-sampled in accordance with a BAYER sub-sampling pattern. The chroma values may be sub-sampled in accordance with a 4:2:2 chroma sub-sampling pattern. As another example, the chroma values may be sub-sampled in accordance with a 4:2:0 chroma sub-sampling pattern.

Determining the edge information for a discarded luma value may include determining a vertical average, determining a horizontal average, and determining whether the vertical average or the horizontal average is closer to the discarded luma value. Alternatively, determining the edge information for a discarded luma value may include determining a vertical average, determining a horizontal average, determining a first diagonal average, determining a second diagonal average, and determining which of the vertical average, the horizontal average, the first diagonal average, and the second diagonal average is closest to the discarded luma value.

The chroma values may be compressed in accordance with a differential pulse-code modulation (DPCM) technique in which eight bits are encoded into seven bits. Alternatively, the chroma values may be compressed in accordance with a DPCM technique in which eight bits are encoded into six bits.

An apparatus for compressing image data is disclosed. The apparatus includes a processor, memory in electronic communication with the processor, and instructions stored in the memory. The instructions are executable to sub-sample chroma values in the image data, thereby obtaining sub-sampled chroma values. The instructions are also executable to compress the sub-sampled chroma values, thereby obtaining compressed, sub-sampled chroma values. The instructions are also executable to sub-sample luma values in the image data, thereby obtaining sub-sampled luma values. The instructions are further executable to determine edge information for the luma values that are discarded as part of the luma sub-sampling operation.

An apparatus for compressing image data is disclosed. The apparatus includes means for sub-sampling chroma values in the image data, thereby obtaining sub-sampled chroma values. The apparatus also includes means for compressing the sub-sampled chroma values, thereby obtaining compressed, sub-sampled chroma values. The apparatus also includes means for sub-sampling luma values in the image data, thereby obtaining sub-sampled luma values. The apparatus also includes means for determining edge information for the luma values that are discarded as part of the luma sub-sampling operation.

A computer-program product for compressing image data is disclosed. The computer-program product includes a computer-readable medium having instructions thereon. The instructions include code for sub-sampling chroma values in the image data, thereby obtaining sub-sampled chroma values. The instructions also include code for compressing the sub-sampled chroma values, thereby obtaining compressed, sub-sampled chroma values. The instructions also include code for sub-sampling luma values in the image data, thereby obtaining sub-sampled luma values. The instructions also include code for determining edge information for the luma values that are discarded as part of the luma sub-sampling operation.

An integrated circuit for compressing image data is disclosed. The integrated circuit is configured to sub-sample chroma values in the image data, thereby obtaining sub-sampled chroma values. The integrated circuit is also configured to compress the sub-sampled chroma values, thereby obtaining compressed, sub-sampled chroma values. The integrated circuit is also configured to sub-sample luma values in the image data, thereby obtaining sub-sampled luma values. The integrated circuit is also configured to determine edge information for the luma values that are discarded as part of the luma sub-sampling operation.

FIG. 1 illustrates an example of an SYUV compressor 102. The SYUV compressor 102 includes a chroma sub-sampling block 104, a chroma compression block 106, a luma sub-sampling block 108, and an edge determination block 110.

The SYUV compressor 102 may receive image data 112 as input. The image data 112 may include luma (Y) values 114 and chroma (U and V) values 116. The chroma values 116 in the image data 112 may be provided to the chroma sub-sampling block 104. The chroma sub-sampling block 104 may sub-sample the chroma values 116 in order to obtain sub-sampled chroma values 118. The chroma compression block 106 may compress the sub-sampled chroma values 118, thereby obtaining compressed, sub-sampled chroma values 120.

The luma values 114 in the image data 112 may be provided to the luma sub-sampling block 108. The luma sub-sampling block 108 may sub-sample the luma values 114 in order to obtain sub-sampled luma values 122. The luma values 114 may also be provided to the edge determination block 110. The edge determination block 110 may use the luma values 114 to determine edge information 124 for the discarded luma values 128 (i.e., the luma values 114 that are discarded as part of the luma sub-sampling operation).

A combiner 130 may combine the sub-sampled luma values 122, the compressed, sub-sampled chroma values 120, and the edge information 124 to form compressed image data 126. The compressed image data 126 may be output by the SYUV compressor 102.

Figure 2:
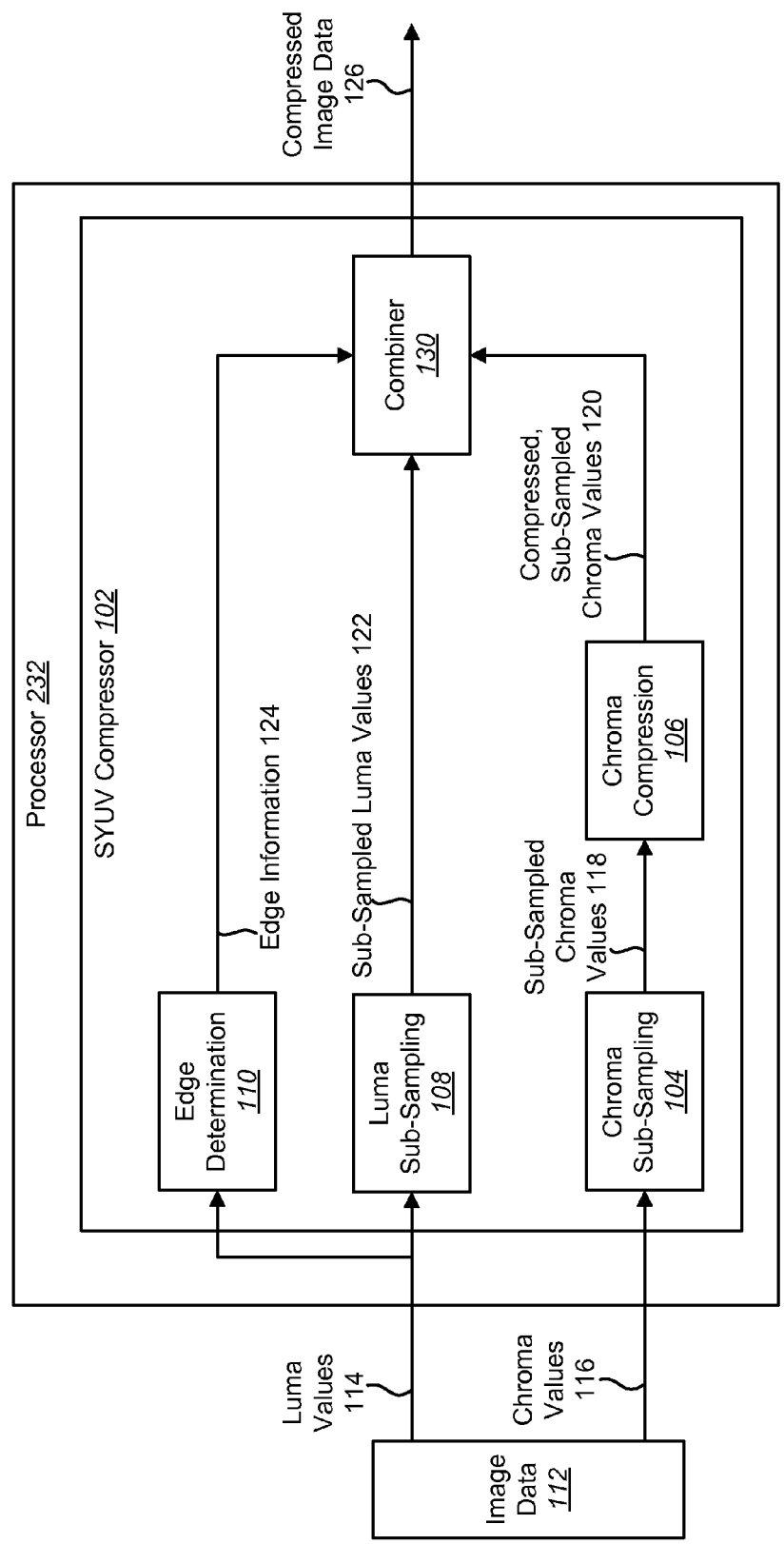
FIG. 2 illustrates the SYUV compressor of FIG. 1 implemented by a processor.

As shown in FIG. 2, a processor 232 may execute instructions and/or perform operations in order to implement the SYUV compressor 102. Alternatively, different processors may be used to implement different components (e.g., one processor may be used to implement the chroma sub-sampling block 104, another processor may be used to implement the chroma compression block 106, another processor may be used to implement the luma sub-sampling block 108, and another processor may be used to implement the edge determination block 110).

Figure 3:
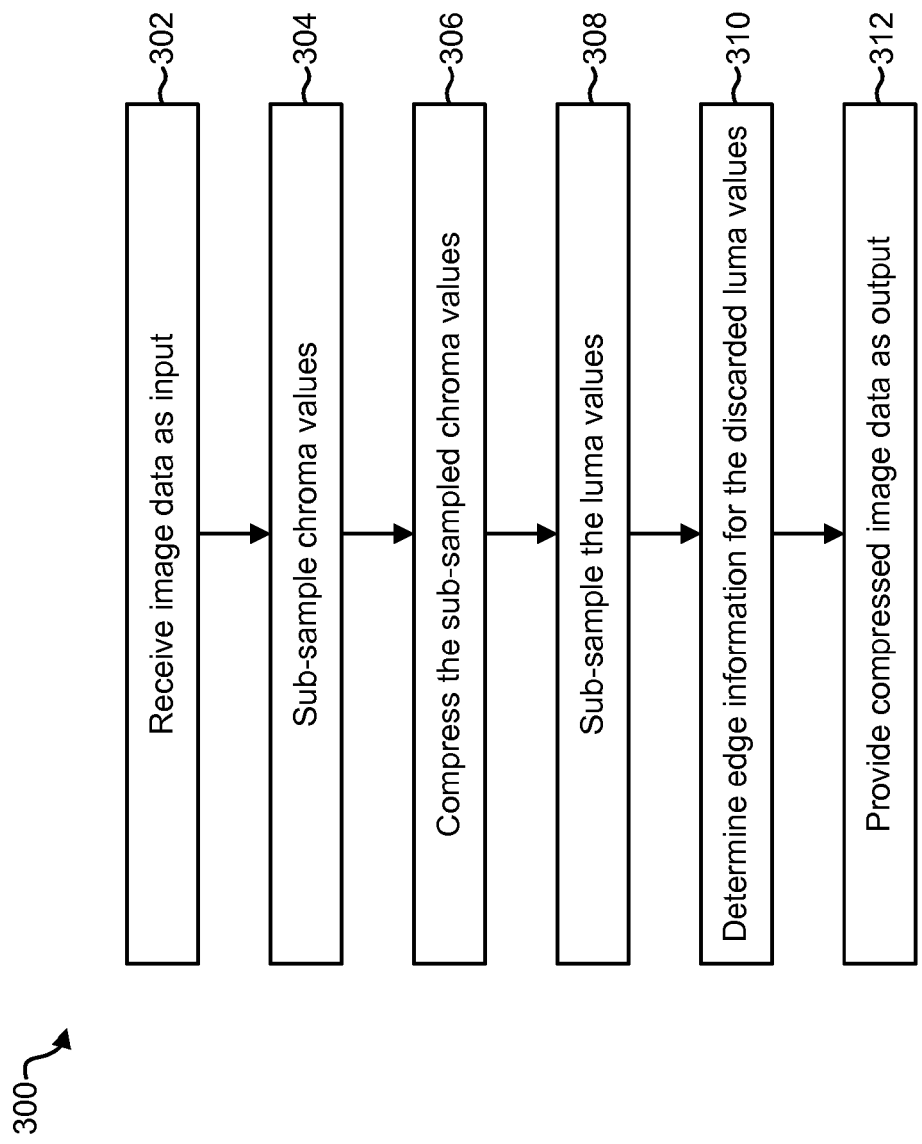
FIG. 3 illustrates a method for compressing image data.

FIG. 3 illustrates a method 300 for compressing image data 112. Image data 112 may be received 302 as input. The image data 112 may include luma (Y) values 114 and chroma (U and V) values 116. The chroma values 116 may be sub-sampled 304 in order to obtain sub-sampled chroma values 118. The sub-sampled chroma values 118 may be compressed 306 in order to obtain compressed, sub-sampled chroma values 120. The luma values 114 may be sub-sampled 308 in order to obtain sub-sampled luma values 122. Edge information 124 may be determined 310 for the discarded luma values 128. Compressed image data 126 may be provided 312 as output. The compressed image data 126 may include the compressed, sub-sampled chroma values 120, the sub-sampled luma values 122, and the edge information 124.

Figure 4:
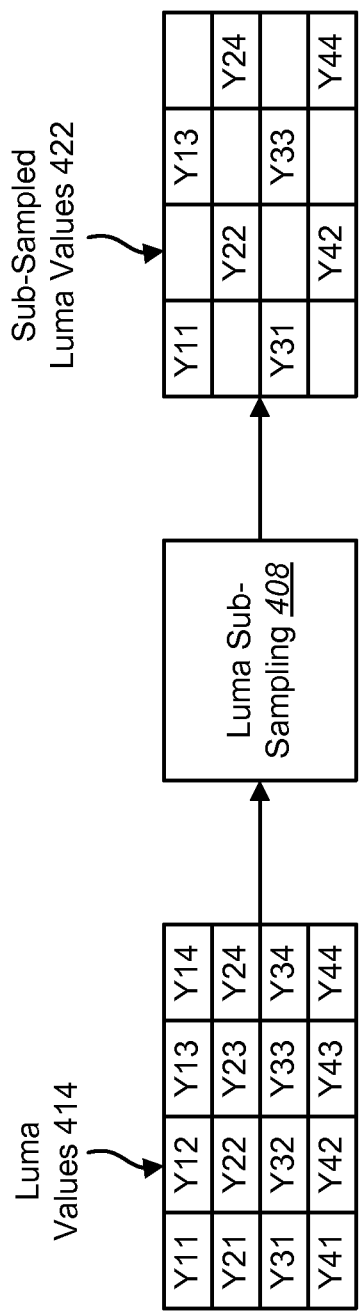
FIG. 4 illustrates an example showing how luma values may be sub-sampled.

FIG. 4 illustrates an example showing how luma values 414 may be sub-sampled. In this example, a 4×4 block of luma values 414 is considered. Each luma value 414 is denoted as Yab, where "a" refers to the row of the pixel that the luma value 414 corresponds to, and where "b" refers to the column of the pixel that the luma value 414 corresponds to. For example, Y23 refers to the luma value 414 for the pixel in the second row and the third column of the image data 112.

The luma sub-sampling block 408 may be configured to sub-sample the luma values 414 in accordance with a BAYER sub-sampling pattern. This type of sub-sampling pattern may also be referred to as a "checkerboard" pattern. For example, as shown in FIG. 4, the luma sub-sampling block 408 may discard the luma values 414 corresponding to pixels in odd-numbered rows and even-numbered columns (i.e., Y12, Y14, Y32 and Y34 in this example), and even-numbered rows and odd-numbered columns (i.e., Y21, Y23, Y41 and Y43 in this example). Alternatively, the luma sub-sampling block 408 may discard the luma values 414 corresponding to pixels in even-numbered rows and even-numbered columns, and odd-numbered rows and odd-numbered columns.

Figure 5:
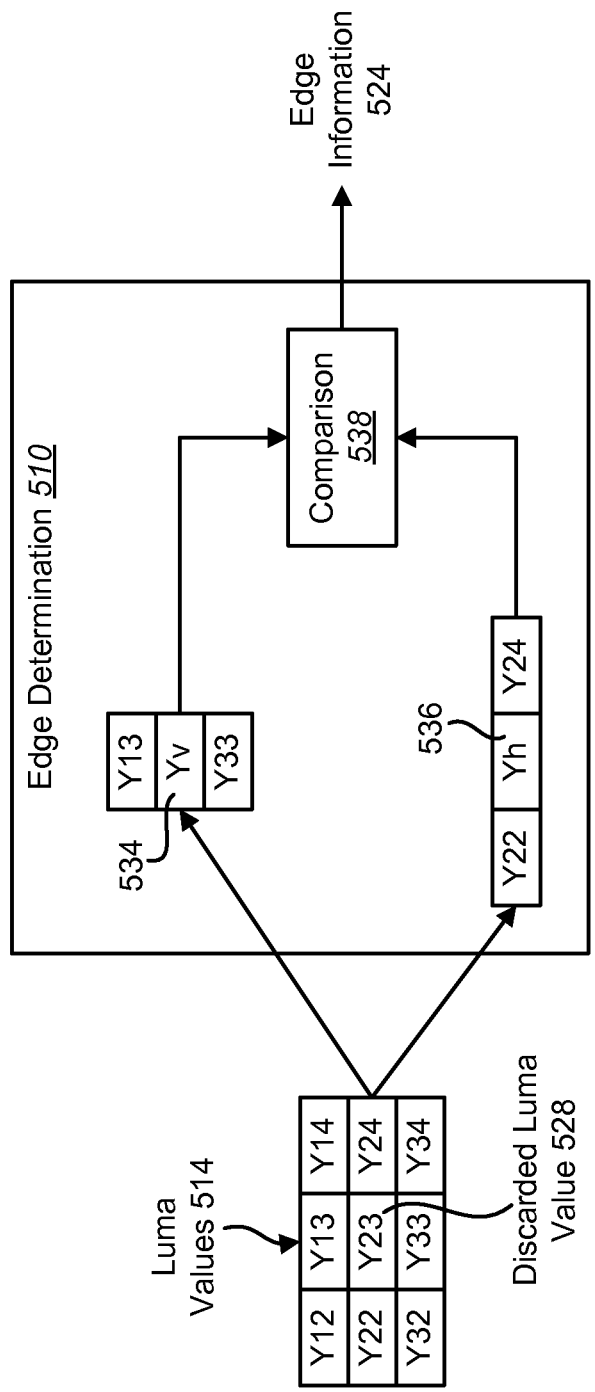
FIG. 5 illustrates an example showing how edge information may be determined for a discarded luma value.

FIG. 5 illustrates an example showing how edge information 524 may be determined for a discarded luma value 528. The discarded luma value 528 that will be considered is Y23 from the example shown in FIG. 4. A 3×3 block of luma values 514 may be used to determine the edge information 524. The discarded luma value 528 (Y23 in this example) is at the center of the 3×3 block of luma values 514.

To determine the edge information 524, both the vertical average (Yv) 534 for Y23 and the horizontal average (Yh) 536 for Y23 may be determined. The vertical average 534 for Y23 is the average of the luma value immediately above Y23 (i.e., Y13) and the luma value immediately below Y23 (i.e., Y33). The horizontal average 536 for Y23 is the average of the luma value immediately to the left of Y23 (i.e., Y22) and the luma value immediately to the right of Y23 (i.e., Y24).

Once the vertical average 534 for Y23 and the horizontal average 536 for Y23 have been determined, a comparison block 538 may determine whether the vertical average 534 or the horizontal average 536 is closer to Y23. If the vertical average 534 is closer to Y23 than the horizontal average 536, then the edge information 524 indicates that the edge is vertical. Conversely, if the horizontal average 536 is closer to Y23 than the vertical average 534, then the edge information 524 indicates that the edge is horizontal.

In the example that is shown in FIG. 5, the edge information 524 may be represented using one bit, which provides two possible values (i.e., "0" or "1"). A first value (e.g., "0") may indicate that the edge is vertical, and a second value (e.g., "1") may indicate that the edge is horizontal.

Figure 6:
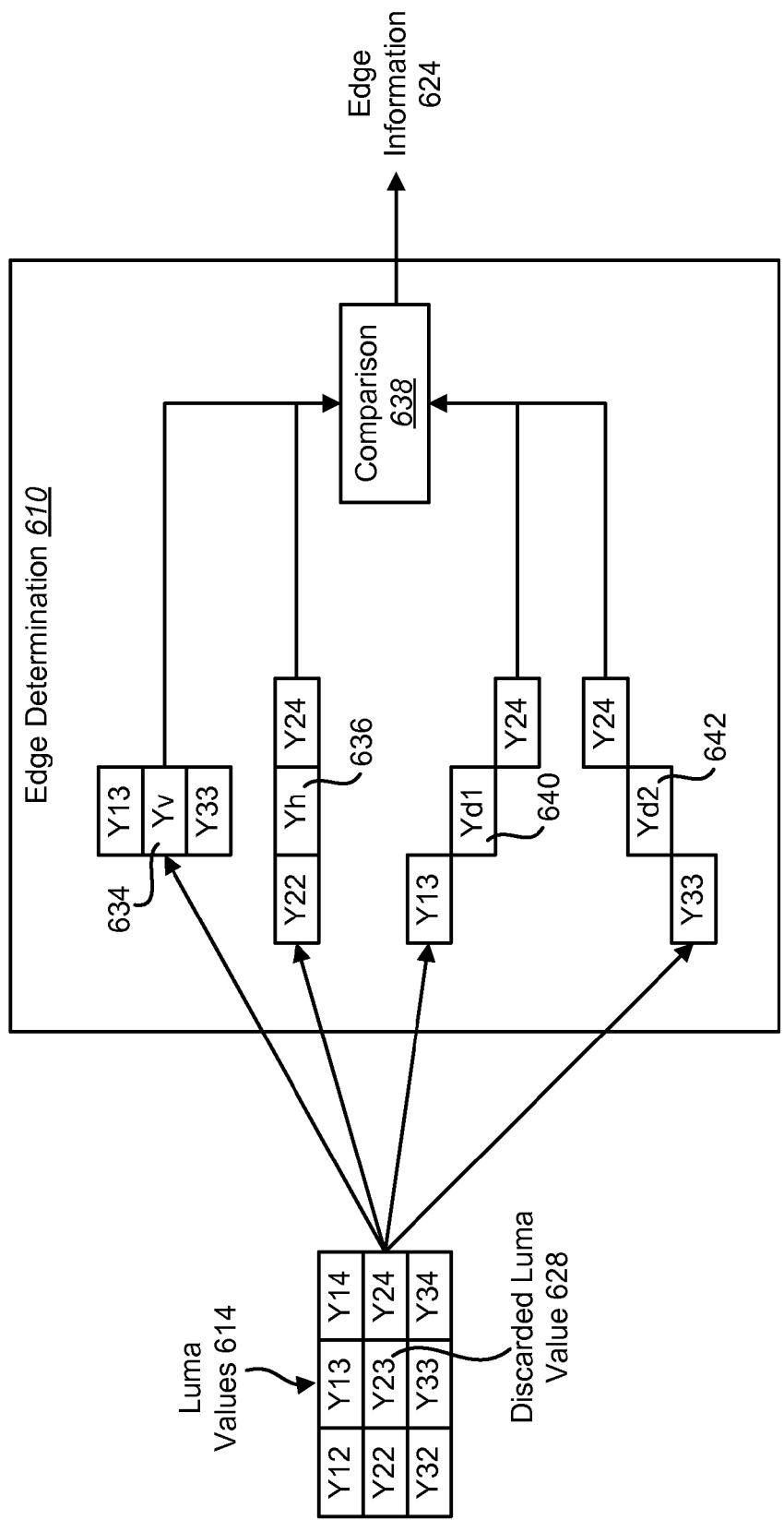
FIG. 6 illustrates another example showing how edge information may be determined for a discarded luma value.

FIG. 6 illustrates another example showing how edge information 624 may be determined for a discarded luma value 628. Once again, the discarded luma value 628 that will be considered is Y23 from the example shown in FIG. 4, and a 3×3 block of luma values 614 (with Y23 at the center) will be used to determine the edge information 624.

As in the previous example, both the vertical average (Yv) 634 for Y23 and the horizontal average (Yh) 636 for Y23 may be determined. In addition two diagonal averages 640, 642 may also be determined. A first diagonal average (Yd1) 640 may be the average of the "northeast" diagonal luma values, i.e., Y13 and Y24 in this example. A second diagonal average (Yd2) 642 may be the average of the "southeast" diagonal luma values, i.e., Y33 and Y24 in this example.

Once the vertical average 634, the horizontal average 636, and the two diagonal averages 640, 642 have been determined, a comparison block 638 may determine which of these averages is closest to Y23. If the vertical average 634 is closest to Y23, then the edge information 624 indicates that the edge is vertical. If the horizontal average 636 is closest to Y23, then the edge information 624 indicates that the edge is horizontal. If the first diagonal average 640 is closest to Y23, then the edge information 624 indicates that the edge is northeast diagonal. If the second diagonal average 642 is closest to Y23, then the edge information 624 indicates that the edge is southeast diagonal.

In the example that is shown in FIG. 6, the edge information 624 may be represented using two bits, which provides four possible values (i.e., "00", "01", "10", or "11"). A first value (e.g., "00") may indicate that the edge is horizontal, a second value (e.g., "01") may indicate that the edge is vertical, a third value (e.g., "10") may indicate that the edge is diagonal northeast, and a fourth value (e.g., "11") may indicate that the edge is diagonal southeast.

Edge information 124 may be determined for each discarded luma value 128. Thus, referring to the luma sub-sampling example of FIG. 4, calculations similar to those illustrated in FIG. 5 (if one bit is used to store the edge information 124) or FIG. 6 (if two bits are used to store the edge information 124) may be performed for Y12, Y14, Y21, Y23, Y32, Y34, Y41 and Y43.

For a luma value that corresponds to a pixel that is on the border of the image, the vertical or horizontal average may be determined using just one luma value. For example, for Y12, the vertical average may be equal to Y22, because Y12 is on the upper border of the image. For Y21, the horizontal average may be equal to Y22, because Y21 is on the left border of the image. With respect to a buffer border condition, the buffer rolls up for the next line (i.e., only the pixels in the lower line are determined and once the line is done, the full line is moved in the top line).

FIG. 7 illustrates an example showing how chroma values 716 may be sub-sampled and then compressed. In this example, a 4×4 block of chroma values 716 (where a chroma value 716 includes both a U value and a V value) is considered. The notation for the chroma values 716 is similar to the notation for the luma values that was described above (e.g., U23 and V23 refer to the U value and the V value, respectively, for the pixel in the second row and the third column of the image data 112).

In this example, a chroma sub-sampling block 704 may be configured to sub-sample the chroma values 716 in accordance with a 4:2:2 chroma sub-sampling pattern. With a 4:2:2 chroma sub-sampling pattern, two U values and two V values are discarded from the top row of a 2×4 block of chroma values, and two U values and two V values are discarded from the bottom row of the 2×4 block of chroma values. In the example that is shown in FIG. 7, U12, U14, V11 and V13 are discarded from the first row of the block of chroma values 716. U22, U24, V21 and V23 are discarded from the second row of the block of chroma values 716. U32, U34, V31 and V33 are discarded from the third row of the block of chroma values 716. U42, U44, V41 and V43 are discarded from the fourth row of the block of chroma values 716.

Alternatively, U11, U13, V12 and V14 may be discarded from the first row of the block of chroma values 716. U21, U23, V22 and V24 may be discarded from the second row of the block of chroma values 716. U31, U33, V32 and V34 may be discarded from the third row of the block of chroma values 716. U41, U43, V42 and V44 may be discarded from the fourth row of the block of chroma values 716.

A chroma compression block 706 may be configured to compress the sub-sampled chroma values 718, thereby obtaining compressed, sub-sampled chroma values 720. Prior to compression, each of the sub-sampled chroma values 718 may be represented using eight bits. The sub-sampled chroma values 718 may be compressed to either seven bits or six bits. The sub-sampled chroma values 718 may be compressed to seven bits if only one bit is needed to represent the edge information 124. The sub-sampled chroma values 718 may be compressed to six bits if two bits are needed to represent the edge information 124. The sub-sampled chroma values 718 may be compressed in accordance with a differential pulse-code modulation (DPCM) technique.

FIG. 8 illustrates another example showing how chroma values 816 may be sub-sampled and then compressed. In this example, a chroma sub-sampling block 804 may be configured to sub-sample the chroma values 816 in accordance with a 4:2:0 chroma sub-sampling pattern. With a 4:2:0 chroma sub-sampling pattern, two U values and two V values are discarded from the top row of a 2×4 block of chroma values 816, and all of the U and Y values are discarded from the bottom row of the 2×4 block of chroma values. In the example that is shown in FIG. 8, U12, U14, V11 and V13 are discarded from the first row of the block of chroma values 816. All of the U and Y values are discarded from the second row of the block of chroma values 816. U32, U34, V31 and V33 are discarded from the third row of the block of chroma values 816. All of the U and Y values are discarded from the fourth row of the block of chroma values 816.

Alternatively, U11, U13, V12 and V14 may be discarded from the first row of the block of chroma values 816. All of the U and Y values may be discarded from the second row of the block of chroma values 816. U31, U33, V32 and V34 may be discarded from the third row of the block of chroma values 816. All of the U and Y values may be discarded from the fourth row of the block of chroma values 816.

A chroma compression block 806 may be configured to compress the sub-sampled chroma values 818, thereby obtaining compressed, sub-sampled chroma values 820. The sub-sampled chroma values 818 may be compressed from eight bits to either seven bits or six bits, as discussed above.

Figure 9:
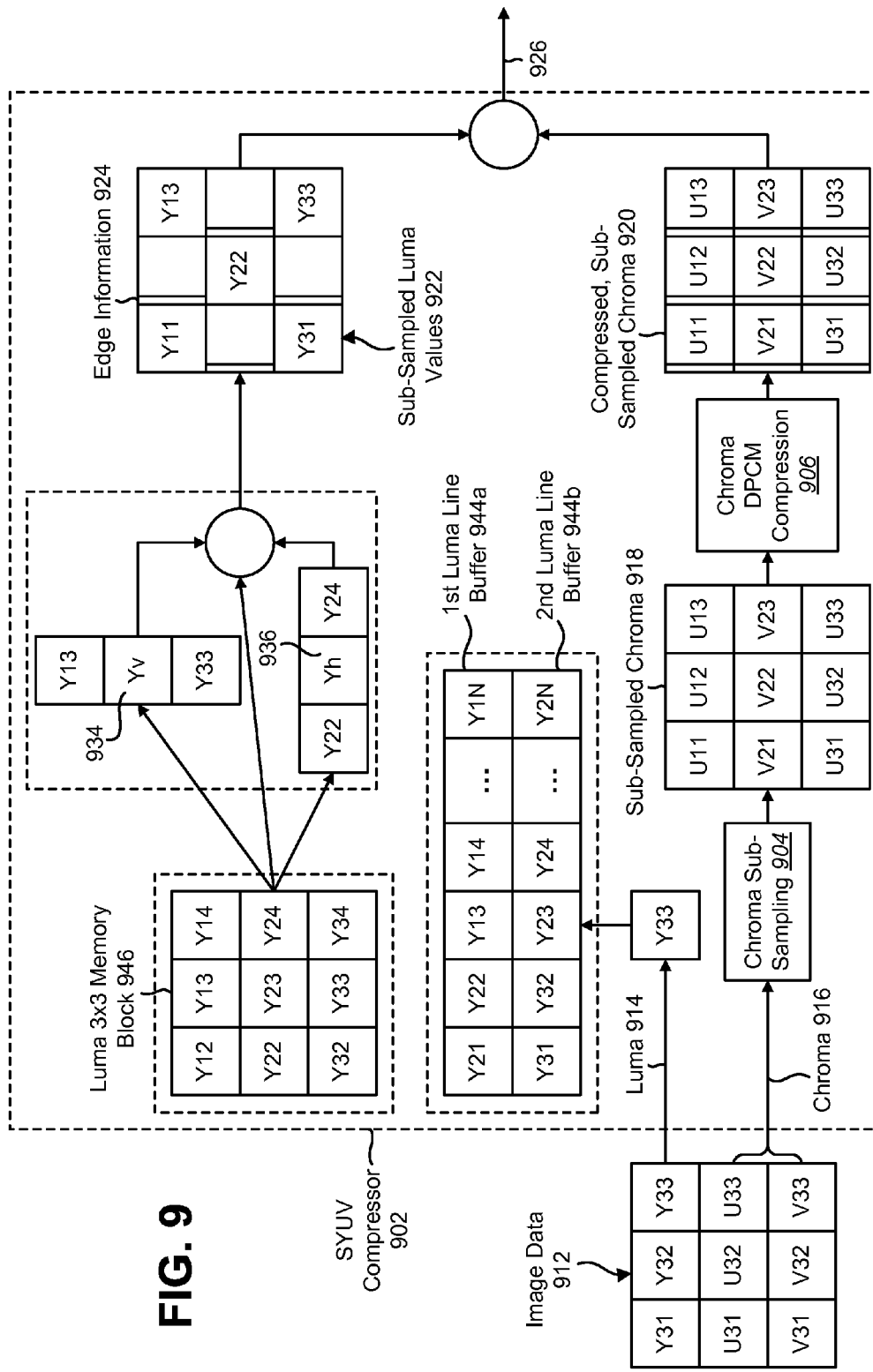
FIG. 9 illustrates another example of an SYUV compressor.

FIG. 9 illustrates another example of an SYUV compressor 902. The SYUV compressor 902 may receive image data 912 as input. The image data 912 may include luma (Y) values 914 and chroma (U and V) values 916. The chroma values 916 in the image data 912 may be provided to the chroma sub-sampling block 904. The chroma sub-sampling block 904 may sub-sample the chroma values 916 in order to obtain sub-sampled chroma values 918. A chroma DPCM compression block 906 may compress the sub-sampled chroma values 918, thereby obtaining compressed, sub-sampled chroma values 920.

The SYUV compressor 902 may include a first line buffer 944a and a second line buffer 944b. Each line buffer 944 may include N columns. The image data 912 may also include N columns. Each incoming luma value 914, which is associated with a pixel in a particular column of the image data 912, may be written to the corresponding column in the second line buffer 944b (e.g., Y31 may be written to the first column in the second line buffer 944b). Prior to writing an incoming luma value 914 to the corresponding column in the second line buffer 944b, the value that is currently stored in that column of the second line buffer 944b may be written to the same column of the first line buffer 944a (e.g., Y21 may be written to the first column in the first line buffer 944a before Y31 is written to the first column in the second line buffer 944b).

The luma values 914 may be sub-sampled in accordance with a BAYER sub-sampling pattern. Edge information 924 may be determined for each luma value 914 that is discarded. To determine edge information 924 for a particular discarded luma value, a 3×3 block 946 of luma values 914 may be considered, with the discarded luma value (Y23 in this example) being in the center of the 3×3 block 946. A 3×3 block 946 may be created for each luma value 914 that is being discarded. In the example that is shown in FIG. 9, it will be assumed that one bit is being used to store the edge information 924. To determine the edge information 924, both the vertical average (Yv) 934 for Y23 and the horizontal average (Yh) 936 for Y23 may be determined.

Once the vertical average 934 for Y23 and the horizontal average 936 for Y23 have been determined, a determination may be made about whether the vertical average 934 or the horizontal average 936 is closer to Y23. If the vertical average 934 is closer to Y23 than the horizontal average 936, then the edge information 924 indicates that the edge is vertical. Conversely, if the horizontal average 936 is closer to Y23 than the vertical average 934, then the edge information 924 indicates that the edge is horizontal.

The compressed, sub-sampled chroma values 920, the sub-sampled luma values 922, and the edge information 924 may be combined to form compressed image data 926. FIG. 10 illustrates an example of compressed image data 1026.

Figure 11:
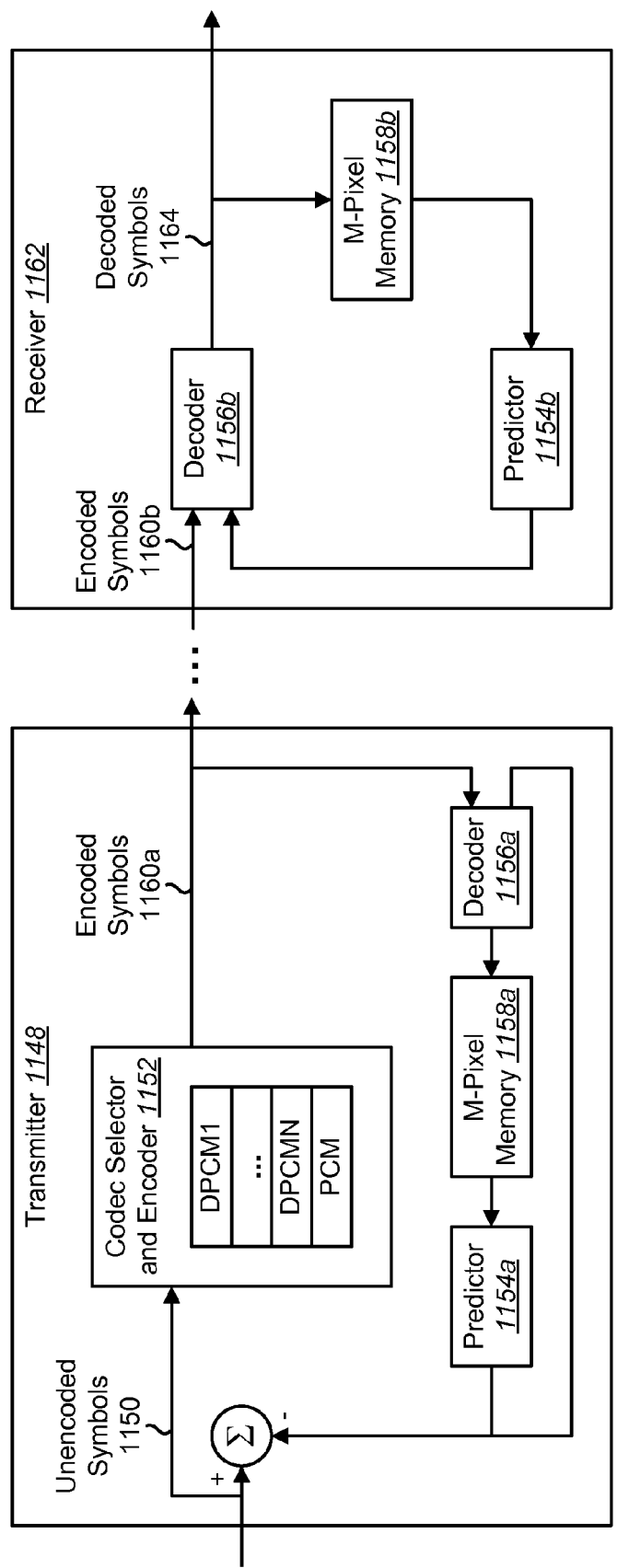
FIG. 11 illustrates an example showing how DPCM compression may be carried out.

FIG. 11 illustrates an example showing how DPCM compression may be carried out. At a transmitter 1148, unencoded symbols 1150 may be provided to a codec selector and encoder 1152. With DPCM, the difference between the current symbol and its predicted value (where the predicted value is based on one or more previous symbols stored in memory 1158a) is encoded. The transmitter 1148 is shown with a predictor 1154a, which may determine the predicted value based on a local version of the decoder 1156a that is stored at the transmitter 1148.

Multiple DPCM modes may be supported, including one mode in which an eight-bit value is compressed to seven bits ("8-to-7 mode"), and another mode in which an eight-bit value is compressed to six bits ("8-to-6 mode"). The 8-to-7 mode may be selected if the edge information 124 occupies one bit. The 8-to-6 mode may be selected if the edge information 124 occupies two bits.

The codec selector and encoder 1152 may output encoded symbols 1160a, which may be transmitted to a receiver 1162. A decoder 1156b at the receiver 1162 may decode the encoded symbols 1160b that are received, thereby obtaining decoded symbols 1164. The decoder 1156b may use the output of a predictor 1154b during the decoding process. The predictor 1154b may provide a predicted value, which may be based on one or more previous symbols stored in memory 1158b.

Advantageously, an SYUV format in accordance with the present disclosure may achieve greater compression efficiency than a corresponding YUV format, while still being perceptually lossless. For example, SYUV 4:4:4 uses 20 bits per pixel (bpp), whereas YUV 4:4:4 uses 24 bpp. FIG. 12 illustrates a comparison of YUV 4:4:4 and SYUV 4:4:4. As another example, SYUV 4:2:2 uses 10.6 bpp, whereas YUV 4:2:2 uses 16 bpp. FIG. 13 illustrates a comparison of YUV 4:2:2 and SYUV 4:2:2. As another example, SYUV 4:2:0 uses 8 bpp, whereas YUV 4:2:0 uses 10.6 bpp. FIG. 14 illustrates a comparison of YUV 4:2:0 and SYUV 4:2:0.

FIG. 15 illustrates certain components that may be included within a wireless communication device 1502. The wireless communication device 1502 includes a processor 1503. The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the wireless communication device 1502 of FIG. 15, in an alternative configuration, a combination of processors (e.g., an ARM and DSP) could be used.

The wireless communication device 1502 also includes memory 1505 in electronic communication with the processor 1503 (i.e., the processor 1503 can read information from and/or write information to the memory 1505). The memory 1505 may be any electronic component capable of storing electronic information. The memory 1505 may be embodied as random access memory (RAM), read only memory (ROM), magnetic disk storage media, optical storage media, flash memory devices in RAM, on-board memory included with the processor, programmable read-only memory (PROM), erasable programmable read only memory (EPROM), electrically erasable PROM (EEPROM), registers, and so forth, including combinations thereof.

Data 1507 and instructions 1509 may be stored in the memory 1505. The instructions 1509 may include one or more programs, routines, sub-routines, functions, procedures, etc. The instructions 1509 may include a single computer-readable statement or many computer-readable statements. The instructions 1509 may be executable by the processor 1503 to implement the methods that are described herein. Executing the instructions 1509 may involve the use of the data 1507 that is stored in the memory 1505. FIG. 15 shows some instructions 1509a and data 1507a being loaded into the processor 1503.

The wireless communication device 1502 may also include a transmitter 1511 and a receiver 1513 to allow transmission and reception of signals between the wireless communication device 1502 and a remote location (e.g., a base station). The transmitter 1511 and receiver 1513 may be collectively referred to as a transceiver 1515. An antenna 1517 may be electrically coupled to the transceiver 1515. The wireless communication device 1502 may also include (not shown) multiple transmitters, multiple receivers, multiple transceivers and/or multiple antenna.

The various components of the wireless communication device 1502 may be coupled together by one or more buses, which may include a power bus, a control signal bus, a status signal bus, a data bus, etc. For simplicity, the various buses are illustrated in FIG. 15 as a bus system 1519.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

In accordance with the present disclosure, a circuit in a computing device (which may be a wireless communication device) may be adapted to sub-sample chroma values in the image data, thereby obtaining sub-sampled chroma values. The same circuit, a different circuit, or a second section of the same or different circuit may be adapted to compress the sub-sampled chroma values, thereby obtaining compressed, sub-sampled chroma values. The second section may be coupled to the first section, or it may be embodied in the same circuit as the first section. In addition, the same circuit, a different circuit, or a third section of the same or different circuit may be adapted to sub-sample luma values in the image data, thereby obtaining sub-sampled luma values. The third section may be coupled to the first and second sections, or it may be embodied in the same circuit as the first and second sections. In addition, the same circuit, a different circuit, or a fourth section of the same or different circuit may be adapted to determine edge information for the luma values that are discarded as part of the luma sub-sampling operation. The fourth section may be coupled to the first, second and third sections, or it may be embodied in the same circuit as the first, second and third sections.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for compressing image data, comprising:
sub-sampling, by a computing device, chroma values in the image data, thereby obtaining sub-sampled chroma values;
compressing, by the computing device, the sub-sampled chroma values, thereby obtaining compressed, sub-sampled chroma values;
sub-sampling, by the computing device, luma values in the image data, thereby obtaining sub-sampled luma values; and
determining, by the computing device, edge information for the luma values that are discarded as part of the luma sub-sampling operation, wherein determining the edge information for a discarded luma value comprises determining which of a plurality of averages is closest to the discarded luma value.

2. The method of claim 1, wherein the luma values are sub-sampled in accordance with a BAYER sub-sampling pattern.

3. The method of claim 1, wherein the chroma values are sub-sampled in accordance with a 4:2:2 chroma sub-sampling pattern.

4. The method of claim 1, wherein the chroma values are sub-sampled in accordance with a 4:2:0 chroma sub-sampling pattern.

5. The method of claim 1, wherein determining the edge information for the discarded luma value comprises:
determining a vertical average;
determining a horizontal average; and
determining whether the vertical average or the horizontal average is closer to the discarded luma value.

6. The method of claim 1, wherein determining the edge information for the discarded luma value comprises:
determining a vertical average;
determining a horizontal average;
determining a first diagonal average;
determining a second diagonal average; and
determining which of the vertical average, the horizontal average, the first diagonal average, and the second diagonal average is closest to the discarded luma value.

7. The method of claim 1, wherein the chroma values are compressed in accordance with a differential pulse-code modulation technique in which eight bits are encoded into seven bits.

8. The method of claim 1, wherein the chroma values are compressed in accordance with a differential pulse-code modulation technique in which eight bits are encoded into six bits.

9. An apparatus for compressing image data, comprising:
a processor;
memory in electronic communication with the processor;
instructions stored in the memory, the instructions being executed to:
sub-sample chroma values in the image data, thereby obtaining sub-sampled chroma values;
compress the sub-sampled chroma values, thereby obtaining compressed, sub-sampled chroma values;
sub-sample luma values in the image data, thereby obtaining sub-sampled luma values; and
determine edge information for the luma values that are discarded as part of the luma sub-sampling operation, wherein determining the edge information for a discarded luma value comprises determining which of a plurality of averages is closest to the discarded luma value.

10. The apparatus of claim 9, wherein the luma values are sub-sampled in accordance with a BAYER sub-sampling pattern.

11. The apparatus of claim 9, wherein the chroma values are sub-sampled in accordance with a 4:2:2 chroma sub-sampling pattern.

12. The apparatus of claim 9, wherein the chroma values are sub-sampled in accordance with a 4:2:0 chroma sub-sampling pattern.

13. The apparatus of claim 9, wherein the instructions that are executed to determine the edge information for the discarded luma value comprise instructions that are executed to:
determine a vertical average;
determine a horizontal average; and
determine whether the vertical average or the horizontal average is closer to the discarded luma value.

14. The apparatus of claim 9, wherein the instructions that are executed to determine the edge information for the discarded luma value comprise instructions that are executed to:
determine a vertical average;
determine a horizontal average;
determine a first diagonal average;
determine a second diagonal average; and
determine which of the vertical average, the horizontal average, the first diagonal average, and the second diagonal average is closest to the discarded luma value.

15. The apparatus of claim 9, wherein the chroma values are compressed in accordance with a differential pulse-code modulation technique in which eight bits are encoded into seven bits.

16. The apparatus of claim 9, wherein the chroma values are compressed in accordance with a differential pulse-code modulation technique in which eight bits are encoded into six bits.

17. An apparatus for compressing image data, comprising:
means for sub-sampling chroma values in the image data, thereby obtaining sub-sampled chroma values;
means for compressing the sub-sampled chroma values, thereby obtaining compressed, sub-sampled chroma values;
means for sub-sampling luma values in the image data, thereby obtaining sub-sampled luma values; and
means for determining edge information for the luma values that are discarded as part of the luma sub-sampling operation.

18. The apparatus of claim 17, wherein the luma values are sub-sampled in accordance with a BAYER sub-sampling pattern.

19. The apparatus of claim 17, wherein the chroma values are sub-sampled in accordance with a 4:2:2 chroma sub-sampling pattern.

20. The apparatus of claim 17, wherein the chroma values are sub-sampled in accordance with a 4:2:0 chroma sub-sampling pattern.

21. The apparatus of claim 17, wherein the means for determining the edge information for a discarded luma value comprises:
means for determining a vertical average;
means for determining a horizontal average; and
means for determining whether the vertical average or the horizontal average is closer to the discarded luma value.

22. The apparatus of claim 17, wherein the means for determining the edge information for a discarded luma value comprises:
means for determining a vertical average;
means for determining a horizontal average;
means for determining a first diagonal average;

means for determining a second diagonal average; and means for determining which of the vertical average, the horizontal average, the first diagonal average, and the second diagonal average is closest to the discarded luma value.

23. The apparatus of claim 17, wherein the chroma values are compressed in accordance with a differential pulse-code modulation technique in which eight bits are encoded into seven bits.

24. The apparatus of claim 17, wherein the chroma values are compressed in accordance with a differential pulse-code modulation technique in which eight bits are encoded into six bits.

25. A computer-program product for compressing image data, the computer-program product comprising a non-transitory computer-readable medium having instructions thereon, the instructions comprising:

code for causing a computing device to sub-sample chroma values in the image data, thereby obtaining sub-sampled chroma values;

code for causing the computing device to compress the sub-sampled chroma values, thereby obtaining compressed, sub-sampled chroma values;

code for causing the computing device to sub-sample luma values in the image data, thereby obtaining sub-sampled luma values; and code for causing the computing device to determine edge information for the luma values that are discarded as part of the luma sub-sampling operation, wherein determining the edge information for a discarded luma value comprises determining which of a plurality of averages is closest to the discarded luma value.

26. The computer-program product of claim 25, wherein the luma values are sub-sampled in accordance with a BAYER sub-sampling pattern.

27. The computer-program product of claim 25, wherein the chroma values are sub-sampled in accordance with a 4:2:2 chroma sub-sampling pattern.

28. The computer-program product of claim 25, wherein the chroma values are sub-sampled in accordance with a 4:2:0 chroma sub-sampling pattern.

29. The computer-program product of claim 25, wherein the code for causing the computing device to determine the edge information for the discarded luma value comprises:

code for causing the computing device to determine a vertical average;

code for causing the computing device to determine a horizontal average; and code for causing the computing device to determine whether the vertical average or the horizontal average is closer to the discarded luma value.

30. The computer-program product of claim 25, wherein the code for causing the computing device to determine the edge information for the discarded luma value comprises:

code for causing the computing device to determine a vertical average;

code for causing the computing device to determine a horizontal average;

code for causing the computing device to determine a first diagonal average;

code for causing the computing device to determine a second diagonal average; and code for causing the computing device to determine which of the vertical average, the horizontal average, the first diagonal average, and the second diagonal average is closest to the discarded luma value.

31. The computer-program product of claim 25, wherein the chroma values are compressed in accordance with a differential pulse-code modulation technique in which eight bits are encoded into seven bits.

32. The computer-program product of claim 25, wherein the chroma values are compressed in accordance with a differential pulse-code modulation technique in which eight bits are encoded into six bits.

33. An integrated circuit for compressing image data, the integrated circuit being configured to:

sub-sample chroma values in the image data, thereby obtaining sub-sampled chroma values;

compress the sub-sampled chroma values, thereby obtaining compressed, sub-sampled chroma values;

sub-sample luma values in the image data, thereby obtaining sub-sampled luma values; and determine edge information for the luma values that are discarded as part of the luma sub-sampling operation, wherein determining the edge information for a discarded luma value comprises determining which of a plurality of averages is closest to the discarded luma value.

34. The integrated circuit of claim 33, wherein the luma values are sub-sampled in accordance with a BAYER sub-sampling pattern.

35. The integrated circuit of claim 33, wherein the chroma values are sub-sampled in accordance with a 4:2:2 chroma sub-sampling pattern.

36. The integrated circuit of claim 33, wherein the chroma values are sub-sampled in accordance with a 4:2:0 chroma sub-sampling pattern.

37. The integrated circuit of claim 33, wherein determining the edge information for the discarded luma value comprises:

determining a vertical average;

determining a horizontal average; and determining whether the vertical average or the horizontal average is closer to the discarded luma value.

38. The integrated circuit of claim 33, wherein determining the edge information for the discarded luma value comprises:

determining a vertical average;

determining a horizontal average;

determining a first diagonal average;

determining a second diagonal average; and determining which of the vertical average, the horizontal average, the first diagonal average, and the second diagonal average is closest to the discarded luma value.

39. The integrated circuit of claim 33, wherein the chroma values are compressed in accordance with a differential pulse-code modulation technique in which eight bits are encoded into seven bits.

40. The integrated circuit of claim 33, wherein the chroma values are compressed in accordance with a differential pulse-code modulation technique in which eight bits are encoded into six bits.

* * * * *